United States Patent [19]

Campbell et al.

[11] Patent Number: 4,907,080
[45] Date of Patent: Mar. 6, 1990

[54] VIDEO SIGNATURE COMPARATOR AND METHOD

[76] Inventors: Robert K. Campbell, 12502 Strathmore Dr., Garden Grove, Calif. 92640; John F. Cerlanek, Jr., 1423 Lambda Pl., Anaheim, Calif. 92805

[21] Appl. No.: 358,131

[22] Filed: May 30, 1989

[51] Int. Cl.$^4$ .......................... H04N 7/18; G06K 9/00
[52] U.S. Cl. ...................................... 358/93; 358/183; 382/3
[58] Field of Search ................. 358/93, 107, 160, 183; 382/3

[56] References Cited

U.S. PATENT DOCUMENTS

| | | | |
|---|---|---|---|
| 3,889,056 | 6/1975 | Mayer | 358/93 |
| 4,156,911 | 5/1979 | Crane | 383/3 |
| 4,789,934 | 12/1988 | Gundersen | 382/3 |

Primary Examiner—Howard W. Britton
Attorney, Agent, or Firm—Morland C. Fischer

[57] ABSTRACT

A relatively low cost, easy to operate video signature comparator and a corresponding method by which a known signature is visually compared to a sample signature to determine whether both signatures were made by the same individual. The signator comparator has particular application to forgery detection or to applications for verifying the authenticity of a signature. An electronic circuit is disclosed which displays video signals that are representative of the known and sample signatures. The circuit enhances video image density variations through extreme contrast and brightness adjustment and forces the lighter regions of each signature to white, such that only the dark stroke lines (indicative of those regions having the greatest density where the maker applied the most pressure) are displayed on video monitor. By visually comparing the characteristic density/pressure variations of the known signature to the sample, an observer can more accurately determine whether both signatures originated from the same maker.

12 Claims, 1 Drawing Sheet

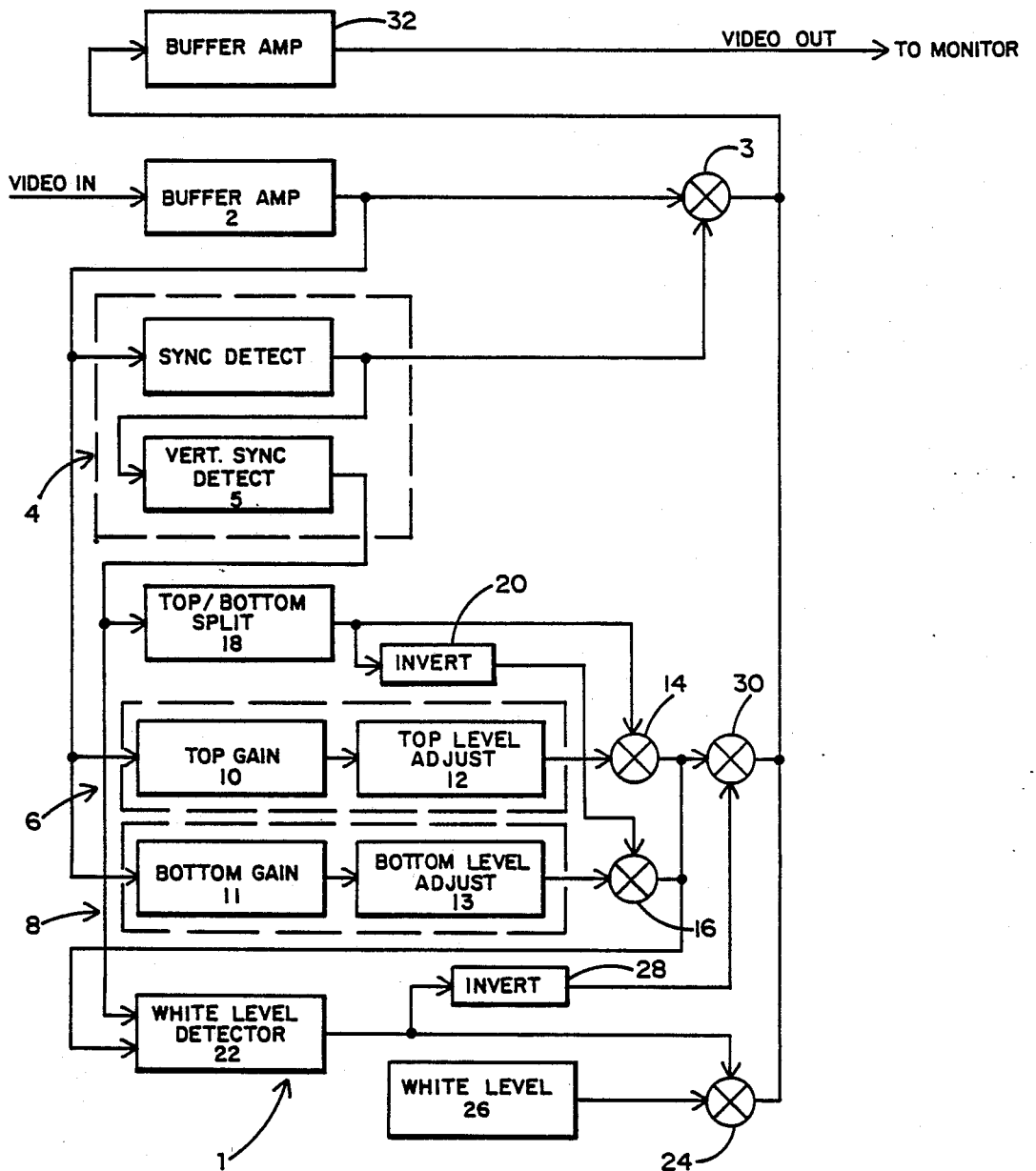

VIDEO SIGNATURE COMPARATOR AND METHOD

BACKGROUND OF THE INVENTION

1. Field of the Invention

This invention relates to a circuit and method for a video signature comparator by which known and sample signatures can be displayed next to one another so that a visual determination can be made as to the authenticity of the sample signature, depending upon the density/pressure variations in the strokes of each signature.

2. Background Art

One known method of determining the authenticity of a sample signature is a real time technique where a pressure transducer is located within a pen, or other writing instrument. As the pen is moved across a pressure sensitive pad, calculations are made to determine the location (i.e. in X-Y coordinates) of the pen at each unit of time. The data is collected and compared to corresponding data regarding a known, authentic signature. Since this technique is performed in real time, the maker of the sample signature must be available before any useful information can be obtained for comparison. That is, such a real time system would be ineffective where the maker of the sample signature is not available and a latent signature is to be studied. Morever, a technique of this kind is generally expensive and complex and requires specialized training to implement and interpret.

Another method of determining the authenticity of a signature involves taking a photograph of the sample signature and analyzing the loops and curls therein relative to a known signature. However, this technique, like that described above, can be complicated and requires specialized training to implement. This requirement may discourage the use of such a system at banks and other commercial establishments where a fast and inexpensive means of verifying the authenticity of many different signatures is desirable for implementation by individuals who may not be specially trained and technically skilled.

SUMMARY OF THE INVENTION

In general terms, a video comparator and method are disclosed by which to visually verify the authenticity of a sample signature relative to a signature which is known to be authentic. The comparator displays representations of the characteristic density/pressure variations that are inherently introduced into the strokes of the known and sample signatures. By comparing the relative density/pressure variations between the two displayed signatures, a determination can be made as to whether both signatures came from the same maker.

More particularly, video input signals corresponding to the known and sample signatures are split so that an easy side-by-side comparison can be made of the pressure variations relative to one another. Video enhancers are provided by which to selectively control the gain and contrast of the video signals. A white level detector is also provided to determine the density (i.e. light or gray areas) of each signature so that such light or gray areas can be eliminated from the video output. However, the remaining darker areas of each signature (representative of the strokes having the greatest density to which the greatest pressure was applied) are supplied from the video enhancers to an output monitor. It is then possible for an observer to compare the characteristic density/pressure variations of the known and sample signatures so as to better determine whether the signatures came from the same maker.

BRIEF DESCRIPTION OF THE DRAWINGS

The sole FIGURE of the drawings is a block diagram that is representative of an electronic circuit for implementing the video signature comparator which forms the present invention.

DESCRIPTION OF THE PREFERRED EMBODIMENT

The signature comparator which forms the present invention is best described while referring to the single FIGURE, where a block diagram is provided to illustrate an electronic circuit that is capable of providing a video display of a known signature which is to be compared, for authenticity, with a sample signature. Thus, the present invention has particular application for forgery detection, for controlling access to a restricted area based upon the verification of one's identity through his signature, or in any other application when verifying the authenticity of a signature is of paramount importance. As will be described in greater detail hereinafter, the signature comparator 1 of the present invention is indicative of the pressure variations which are characteristic of an individual's signature. Such characteristic density/pressure variations are unique to each individual and, therefore, can be used to verify the authenticity of a signature and/or the identity of the maker.

That is to say, the soon to be described signature comparator enhances the latent density of the ink that is deposited on a paper at the time that the signature is created. The harder a pen is depressed during the making of a signature, the greater will be the density of the resulting ink deposited and, correspondingly, the darker will be the resulting signature stroke. Thus, the density of the ink is used herein as a measure of pressure variation. Since the applied pressure variations are unique to each signature, as previously described, a compression of such pressure variations in both the known and sample signatures will permit a verification of the sample signature relative to the known signature.

Video input signals which are indicative of the two signatures (i.e. a known, authentic signature and a sample signature to be compared thereto) are provided to the signature comparator 1. The video input signals are preferably obtained by using either a single or a pair of video cameras. The video input signals are applied to and amplified by an input buffer amplifier 2. The amplified output of buffer amplifier 2 is applied to one input terminal of an analog switch 3. The amplified output of buffer amplifier 2 is also applied to a sync detector 4. Sync detector 4 may be generally characterized as a level comparator which detects whether horizontal or vertical sync signals are contained by the video input signals. By way of example only, sync detector 4 may be implemented by an LM521 microelectronic chip.

The output of sync detector 4 is applied to a second input terminal of analog switch 3, whereby both the horizontal and vertical syncs of the video input signals can be fed directly to the video output of comparator 1 to thereby preserve the sync information. More particularly, switch 3 is controlled by sync detector 4, such that switch 3 is turned on any time that sync information is applied thereto by way of detector 4.

The video input signals are also supplied from buffer amplifier 2 to a pair of identical video enhancers 6 and 8. The first video enhancer receives video information corresponding to a first of the signatures, while the second video enhancer 8 receives video information corresponding to the second signature. Each of the video enhancers 6 and 8 includes a manually adjustable gain stage 10 and 11 and a manually adjustable level adjust stage 12 and 13, whereby to permit an operator to selectively control the contrast and brightness, respectively, of the video input signals. Accordingly, the operator can normalize the densities of the two signatures in the event that one signature is darker than the other. More particularly, the contrast controlling stages 10 and 11 of the video enhancers 6 and 8 increase the amplitude of the video input signals by increasing the gain thereof. By way of example only, each of the stages 10 and 11 may be implemented by an LF356 microelectronic chip. The level adjusting stages 12 and 13 of video enhancers 6 and 8 shifts the amplitude of the video signals from contrast controlling stages 10 and 11 to white (i.e. maximum brightness). By way of example only, each of the stages 12 and 13 may also be implemented by an LF356 microelectronic chip.

The outputs of video enhancers 6 and 8 are applied to first input terminals of respective analog switches 14 and 16. Analog switches 14 and 16 are used in the present embodiment as on-off switches for multiplexing the video enhancers 6 and 8 to control the video output voltage. That is, one of the switches 14 or 16 is turned on while the other switch is turned off, and vice versa. By way of example only, each analog switch may be implemented from a 4016 microelectronic chip.

A vertical sync detector 6 filters out the horizontal sync from the sync information at the output of sync detector 4 and applies the remaining vertical sync information to respective terminals of a screen splitter 18 and a white level detector 22. Screen splitter 18 is utilized for purposes of convenience, whereby video output signals, which are representative of the pair of signatures to be compared, can be displayed next to one another on a split video screen. In this manner, it will be easier for an observer to compare the characteristic density/pressure variations of the signatures. The output signal of screen splitter 18 is applied to a second input terminal of one of the analog switches 14. The output signal of screen splitter 18 is also inverted (by means of a conventional inverter 20) and then applied to a second terminal of the other one of the analog switches 16.

The output terminals of analog switches 14 and 16 are connected together and to an input terminal of the white level detector 22. As was earlier disclosed, vertical sync information is also supplied from vertical sync detecting stage 5 of sync detector 4 to the white level detector 22. White level detector 22 is responsive to the voltages of the output signals from the video enhancers 6 and 8 (via analog switches 14 and 16), whereby to cut off or eliminate shades of gray in the video output signals. Thus, all video signals applied to the detector 22 which are determined to be brighter (i.e. whiter) than the level to which the video enhances 6 and 8 are adjustably set by the operator are forced to a white voltage level. In this manner, the characteristic density/pressure variations in the signatures being compared are enhanced, inasmuch as all light and gray images are removed from the video output signals which are representative of said signatures.

The output signal of white level detector 22 is applied to one input terminal of an analog switch 24. The output of a white level voltage source 26 is applied to a second input terminal of analog switch 24. White level source 26 provides a fixed reference voltage which defines the white voltage level. Analog switch 24 is controlled by white level detector 22. That is, switch 24 is turned on when the input signals applied thereto from level detector 22 and reference source 26 correspond to voltage levels which are representative of white but not sync voltages.

The output signal from white level detector 22 is also inverted, by means of a conventional inverter 28, and applied to one input terminal of an analog switch 30. The output terminals of the aforementioned analog switches 14 and 16 are connected together and to a second input terminal of analog switch 30. Switch 30 is also controlled by level detector 22, such that switch 30 is turned on when the signals applied thereto from inverter 28 and one of the switch 14 or 16 correspond to voltage levels which are representative of not sync and not white voltages. Therefore, only one of the analog switches 24, 30 or 3 is turned on at any one time. In this manner, if white level detector 22 detects a signal which is smaller (i.e. lighter) than a particular level, the reference white voltage from source 26 is conducted through switch 24. However, if the detector 22 detects a signal which is larger (i.e. darker) than the predetermined level, then the enhanced video signals from video enhancers 6 and 8 are otherwise conducted through switch 30. Moreover, and as earlier indicated, switch 3 is rendered conductive whenever the video input signal contains sync information, such that switches 24 and 30 are rendered non-conductive.

The output terminals of analog switches 3, 24 and 30 are connected together at the input terminal of an output buffer amplifier 32. Buffer amplifier 32 is similar to previously described buffer amplifier 2 and may be implemented, for example, by an LF356 microelectronic chip. The output of amplifier 32 is a video signal that may be applied to any video display (i.e. monitor). However, and by virtue of the foregoing, the video information displayed will represent images of the two signatures, one next to the other. By selectively adjusting the video enhancers 6 and 8, the lighter ink density variations of the signatures can be forced to white and eliminated from the output display, such that only those particular areas of the signatures which are the darkest (indicative of regions of the signatures at which the maker applied the most pressure) will be displayed. By visually comparing the characteristic density/pressure variations of each of the two signatures in terms of location and magnitude, an observer will be better able to determine whether the known and sample signatures were made by the same individual.

It will be apparent that while a preferred embodiment of the invention has been shown and described, various modifications and changes may be made without departing from the true spirit and scope of the invention. For example, while the present invention has been described as having particular application to the authentication of a written signature, it is to be understood that any other writing, not limited to a signature, may also be compared for authenticity to a known writing.

Having thus set forth a preferred embodiment of the invention, what is claimed is;

1. A method for visually determining the authenticity of a sample writing relative to a known authentic writing depending upon the relative density/pressure variations in the strokes of each writing, said method comprising the steps of:
   generating respective video input signals representative of each of the known and sample writings;
   detecting the brightness of said video input signals;
   electronically forcing to white any portions of the video input signals which are detected to be lighter than a particular brightness;
   displaying the video signals so that only the portions thereof which are detected to be darker than the particular brightness, corresponding to the strokes of each writing to which the greatest pressure was applied by its maker, are visible; and
   comparing the visible portions of the video signals to one another.

2. The method recited in claim 1, including the additional step of splitting the video input signals so that the visible portions of said signals representing the known and sample writings are displayed next to one another.

3. The method recited in claim 1, including the additional steps of detecting the horizontal and vertical syncs of the video input signals and injecting information corresponding thereto into said video signals being displayed.

4. The method recited in claim 1, including the additional step of selectively adjusting the brightness and contrast of the video input signals to enhance the density/pressure variations of the video signals to be displayed.

5. The method recited in claim 1, including the additional steps of providing a reference voltage which is indicative of white video and driving the portions of the video input signals which are detected to be lighter than the particular brightness to said reference voltage.

6. Apparatus by which a visual determination can be made as to the authenticity of a sample writing relative to a known, authentic writing depending upon the density/pressure variations in the strokes of each writing, said apparatus comprising:
   means for generating respective input signals which are representative of each of the known and sample writings;
   means for detecting the brightness of said video input signals;
   means for electronically forcing to white any portions of the video input signals which are detected to be lighter than a particular brightness; and
   means for displaying the video signals so that only the portions thereof which are detected to be darker than the particular brightness, corresponding to the strokes of each writing to which the greatest pressure was applied by its maker, are visible so that said visible portions can be compared to one another.

7. The apparatus recited in claim 6, further comprising means for splitting the input video signals so that the visible portions of said signals representing the known and sample writings can be displayed next to one another at said display means.

8. The apparatus recited in claim 6, further comprising reference signal generating means for generating a reference voltage that is indicative of white video, said reference signal generating means driving the portions of the video input signals which are lighter than the particular brightness to said reference voltage.

9. The apparatus recited in claim 6, further comprising means for detecting the horizontal and vertical syncs of the video input signals and injecting information corresponding thereto into the video signals being displayed at said display means.

10. The apparatus recited in claim 9, further comprising video enhancing means by which to selectively adjust the brightness and contrast of the video input signals so as to enhance the density/pressure variations of the video signals to be displayed.

11. The apparatus recited in claim 10, wherein said brightness detecting means is responsive to the output signals from said video enhancing means and the vertical sync of said input video signals detected by said sync detecting means.

12. A signature comparator for displaying at a video display a known signature and a sample signature so that the sample signature can be compared for authenticity to the known signature, said signature comparator comprising:
   means for providing viedo input signals which are representative of the known and sample signatures;
   reference white level signal generating means;
   means for detecting the brightness of the input signals;
   means to adjust the gain and contrast of the video input signals to enhance the density/pressure variations thereof; and
   means to provide to the video display either a white level signal from said reference signal generating means whenever the brightness detected by said brightness detecting means is lighter than a particular brightness of a video enhanced signal from said gain and contrast adjusting means whenever the brightness detected by said brightness detecting means is darker than the particular brightness.

* * * * *